(12) United States Patent  
Hunt

(10) Patent No.: US 6,390,076 B2
(45) Date of Patent: May 21, 2002

(54) SYSTEMS AND METHODS FOR DELIVERING ATOMIZED FLUIDS

(75) Inventor: Andrew T. Hunt, Chamblee, GA (US)

(73) Assignee: MicroCoating Technologies, Inc., Atlanta, GA (US)

( * ) Notice: Subject to any disclaimer, the term of this patent is extended or adjusted under 35 U.S.C. 154(b) by 0 days.

(21) Appl. No.: 09/851,349

(22) Filed: May 8, 2001

Related U.S. Application Data

(62) Division of application No. 09/161,348, filed on Sep. 25, 1998.

(51) Int. Cl.[7] .................................................. F02G 5/00
(52) U.S. Cl. ........................ 123/549; 123/557; 431/208
(58) Field of Search ........................... 431/11, 207–248; 239/75, 136; 123/549, 557

(56) References Cited

U.S. PATENT DOCUMENTS

| | | | |
|---|---|---|---|
| 4,301,966 A | * 11/1981 | Schwarz | 239/75 |
| 4,472,134 A | * 9/1984 | Ettman | 431/208 |
| 5,058,512 A | * 10/1991 | Specht | 431/208 |
| 5,080,579 A | * 1/1992 | Specht | 431/207 |
| 6,135,360 A | * 10/2000 | Ren et al. | 239/136 |

* cited by examiner

Primary Examiner—Marguerite McMahon
(74) Attorney, Agent, or Firm—Alfred H. Muratori; Wayne E. Nacker

(57) ABSTRACT

A method for causing a very fine atomization or vaporization of a liquid or liquid-like fluid, where the resulting atomized or vaporized solution is entered into engine, instrument or area for the fluid to be in mixed. The ability of the near supercritical atomizer to produce very fine droplets of a wide range of liquids without any aspirant is very important for number of industrial applications. Especially when the drop size can be so finely controlled. Industries needing such fine atomization include applications such as combustion, engines, scientific equipment, chemical processing, waste disposal control, cleaning, etching, insect control, surface modification, humidification and vaporization. It is important in these applications not to cause a decomposition of the material being atomized. Staying below the supercritical point normally enables no decomposition and/or no precipitation of components within the liquid or fluid in most applications, but a very fine atomization is obtained without the need of any aspirant.

11 Claims, 3 Drawing Sheets

SYSTEMS AND METHODS FOR DELIVERING ATOMIZED FLUIDS

REFERENCE TO RELATED APPLICATIONS

This application is a divisional of U.S. Ser. No 09/161, 348, entitled "Systems and Methods for Delivering Atomized Fluids", filed Sep. 25, 1998, which in turn claims priority to U.S. Ser. No. 08/691,853, entitled "Chemical Vapor Deposition and Powder Formation Using Thermal Spray With Near Supercritical and Supercritical Fluid Solutions", filed Aug. 2, 1996, the teachings of both of which are herein incorporated by reference.

FIELD OF THE INVENTION

The systems and methods described herein relate to technologies for delivering fuels and, more particularly, to systems and methods for atomizing fuels for allowing delivery of the atomized fuel to a combustion zone.

BACKGROUND OF THE INVENTION

Technologies for atomizing fluids and materials are important to a number of industries and to a wide range of applications. One particular application is the delivery of combustible fuels to spark-ignition engines. For this application it is desired to minimize the size of the resulting droplets, or to yield vaporization of the fuel. In fuel delivery systems it is understood that reduced droplet size leads to greater combustion efficiency, which, in turn leads to reduced waste and greater environmental performance.

One common technique for atomizing a liquid fuel is to employ an aspirating gas flow to break-up the liquid into droplets. This technique is employed by carburetors, which are still the predominant fuel delivery system used today for small combustion engines. Although these aspirating systems yield acceptable results for small gasoline powered spark ignition engines, the size of the droplets produced during atomization is still relatively large, and less than optimal for many fuels and more demanding applications. Improvements and modifications that would eliminate or reduce the size of drops provided by the aspiration technique have been suggested, such as screening and flow redirection, but these modification also reduce throughput and create waste problems. Moreover, neither of these improvements address an additional problem with the aspirating technique, which is that the aspirating gas, typically air, can dilute the fuel being delivered, reducing the concentration of the fuel delivered and reducing efficiency of subsequent combustion.

In light of these problems, a considerable amount of research has gone into developing techniques that provide greater atomization of liquid fuels, without requiring an aspirating gas. For example, ultrasonic and electrostatic atomization devices have been developed and employed to further reduce drop size and to eliminate, or reduce, the need for an aspirating gas flow. However, the results achieved with such systems have been mixed and such systems often fail to provide the desired high droplet velocities. Vaporization via heating has also been used, but this technique has resulted in distillation and problems such as fractionation, residue buildup, and decomposition.

By far the most successful alternative to the carburetor has been the fuel injector. Fuel injectors, although more complicated and expensive, provide direct, proportional fuel metering capability under electrical control. Automotive engines in the U.S. now use gasoline fuel injection of two primary types: 1) throttle body injection for the whole engine and 2) port fuel injection for each cylinder. The primary advantages of fuel injection are better specific power (lower fuel consumption per unit power generated) and far better integration with the engine control unit; this results in much lower emissions through better control under a variety of environmental and operating conditions. The control unit can then implement ever more complex and efficient control algorithms, integrating with more sensors to determine optimal settings for the simple control (timing and duration) of the fuel injector, thus further improving fuel economy and reducing exhaust emissions. Accordingly, the fuel injector allows the use of computerized control systems to help optimize performance.

However, fuel injectors efficiencies are still limited by the size of the drops that form the injector spray. Increasingly over the last few years, much experimentation and advanced design has been conducted on the mechanical configuration of fuel injectors to improve their spray/atomization characteristics while keeping their electrical controllability, which is their chief advantage. For example, there has been extensive research and experimentation with forced-air assisted atomization, micro-machining of injection plates, use of flow-swirling effects as well as other approaches. Although significant improvements have occurred, several hurdles still remain. For example, the spray/atomization characteristics of today's fuel injectors is still insufficient to allow for the use of low vapor pressure fuels, also know as heavy fuels, such as kerosene. To date, the new injector designs and processes do not achieve the very fine atomization and subsequent vaporization required for a successful operation as an spark ignition engine with a heavy fuel. The literature does report that one researcher has successfully cold started a small spark-ignition engine with a crude but effective kerosene vaporizing unit, however this technology is not very controllable nor packageable as a compact fuel injector. Nor is it clear that these systems can provide the very lean mixture that will ignite reliably and controllably at the high compressions ratios needed for the efficiencies demanded today. The approach taken by other researchers has been direct injection of heavy fuels into the engine cylinder. It is not clear however, that these attempts at direct injection vaporization of fuel will actually circumvent the problems of cold start and proper running of kerosene-fueled, spark-ignition engine at low ambient temperatures conditions. Moreover, present research in using heavy fuels with spark ignition engines has shown that the existing techniques fail to deliver fuel in a manner that will effectively ignite, causing the build up of liquid fuel in the engine and the eventual fouling of the spark plug.

Accordingly, there is a need in the art for a fuel delivery system that provides improved vaporization capability to allow for the delivery of conventional low vapor pressure liquid fuels and that can be packaged and engineered as both a direct (in cylinder) or indirect (port/throttle body) fuel injector.

It is further desired to provide fuel delivery systems that can produce atomized volumes of fuel with sufficiently small droplet size to overcome the long-standing problems with cold-start when employing low vapor pressure fuels to fire small, lightweight, heavy fuel-fired, spark-ignition engines.

SUMMARY OF THE INVENTION

The systems and methods described herein include fuel atomizers that, inter alia, enable liquid fuels to burn like gases. More specifically, the systems described herein provide fuel atomizer/injectors that enable the use of heavy fuels to fire small, light weight, low compression ratio, spark-ignition piston engines that typically burn gasoline. It is understood that the fuel injection systems described herein create a spray of fine droplets from liquid, or liquid-like filets, by moving the fuels toward their supercritical temperature and releasing the fuels into a region of lower pressure on the gas stability field in the phase diagram associated with the fuels. It is understood that this release into an area of low pressure (relative to the supercritical pressure range of the fuel) causes a fine atomization or vaporization of the fuel. Depending upon the application, gasses, such as oxygen or air, can be entrained or fed into the dispersion to facilitate combustion.

More specifically, the systems and methods of the invention include, in one aspect, processes for injecting a fuel into a combustion engine, wherein the processes involve providing a source of fuel at a pressure near or within the supercritical range associated with the fuel, providing a restrictor adapted for carrying the fuel, passing the fuel through the restrictor and raising the temperature of the fuel passing through the restrictor to a temperature near or within the super critical range associated with the fuel, whereby fuel leaving the restrictor is projected as an atomized spray into a combustion engine. In one practice, the fuel provided to the restrictor is substantially at ambient temperature. To raise the temperature of the fuel, the distal end of the restrictor can be heated so that the fuel passing through the distal end is raised to a temperature within the critical range of the fuel. To this end, the step of providing a restrictor can include a step of providing a restrictor that has its distal end coupled to a heater element, whereby operating the heater element raises the temperature of the fuel passing through the distal end of the restrictor.

In a further practice, the temperature of fuel passing through the restrictor can be controlled to allow for controlling a characteristic of the atomized spray that is representative of an average drop size of particles within the atomized spray. This is understood to allow for the selection of the extent of atomization achieved by the fuel delivery system, from a spray of fine drops to a vaporized volume of fuel, optionally being able to select any point of vaporization in between.

In a further practice, the act of providing a source of fuel can include the acts of providing first and second sources of fuel each being at pressures near the respective supercritical range of the respective fuels and passing the first and second fuels through the restrictor. In this practice, the acts of providing first and second sources of fuels can include providing as the first source of fuel, a fuel capable of acting as a starter fuel, and providing as the second source of fuel, a fuel capable of acting as a primary operating fuel. The fuels can be mixed together and the mixed fuel can be passed through the restrictor. Alternatively, the selection between fuels can be sequential, allowing for delivery of a first fuel and then a second, or third. Further practices allow for the gradual transition between different fuels, by for example allowing a gradual transition between a first fuel and a second fuel, with a mix of the fuels occurring during interim delivery. It will be appreciated by those of ordinary skill in the art that fuels can also be mixed that are supercritical states, as it is understood that fluids in supercritical states are highly effective as solvents. Accordingly, the system can provide a solvent delivery system that mixes compatible or incompatible chemicals just prior to injection into the restrictor, such that the time between mixing and atomization is minimized.

In a further practice, the processes can include the operation of preheating fuel that is being passed through the restrictor. To this end, the processes can provide a preheater for heating a selected volume of fuel, and passing the preheated volume of fuel through the restrictor for delivery to the combustion engine. In one embodiment the systems include a waste heat collector so that the processes can collect waste heat generated by the combustion engine for heating fuel being passed through the restrictor.

Further described herein are fuel delivery systems for delivering an atomized spray of fuel to a combustion zone. These fuel delivery systems can include a fuel pump that is coupled in fluid communication with a source of fuel and that is capable of pumping the fuel at a pressure within the supercritical range of the fuel. The systems can further include a restrictor that has an input port in fluid communication with the fuel pump and an output port, and that is adapted for allowing fuel to pass from the input port to the output port and into the combustion zone. The systems can also include a heater that is coupled to the restrictor and that is capable of heating the restrictor for raising the temperature of the fuel to a temperature within the supercritical range of the fuel, whereby fuel passing through the restrictor is heated to a temperature near or within the supercritical range of fuel for forming an atomized spray that is ejected from the output port and into the combustion zone.

The restrictors can be formed of a tube of electrically resistive material and the heater element can include a source of electrical current that is connected to the tube for delivering current there through. A thermal control unit can operate the heater to control the temperature of fuel passing through the restrictor and, as noted above, can allow for the selection of average drop size of drops within the atomized spray. In some embodiments the fuel delivery systems can pass a plurality of fuels through the restrictor, and to that end can include mixers for mixing fuel for a plurality of fuel sources, as well as a set of controllable valves for sequentially controlling the passing of fuels to the restrictor.

In a further embodiment, the systems described herein include a preheater for heating fuel that is to be passed through the restrictor. In this way the restrictor is provided with a source of preheated fuel, thereby reducing the temperature difference between the temperature of the fuel being passed through the restrictor and the temperature to which the fuel will be raised before the fuel can be placed near or within the supercritical temperature range. In one embodiment, the system includes a preheater that has waste heat collection system that collects heat from the combustion chamber for allowing the preheater to heat fuel being passed to the restrictor. Other preheating systems can be employed, including electrical and flame heaters.

In a further aspect, the invention can be understood as methods for forming a combustible mixture. The processes involve providing a restrictor having an input port and an output port and passage therebetween, delivering a fuel to restrictor input port at a pressure substantially at or near the supercritical pressure of the fuel, passing the pressurized fuel through the passage of the restrictor, heating the pressurized fuel passing through the restrictor to a temperature sufficient to cause an atomized spray to eject from an output port, and injecting the atomized spray into an air intake port carrying a stream of air. In one practice of this method, the fuel being passed through the restrictor can be metered for controlling the ratio of fuel and air being carried through the intake port. Further, the temperature of pressurized fuel passing through the restrictor can be controlled to adjust a characteristic of the atomized spray representative of the average drop size of material in the atomized spray. The atomized spray can be provided to a combustion chamber of an engine, the combustion chamber of a burner, or to any other suitable combustion chamber. The fuels provided through the restrictor can include fuels comprising a low volatility liquid fuel, such as fuels comprising kerosene.

Other aspects and embodiments of the invention will be apparent from the following description of certain illustrative embodiments.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The systems and methods described herein provide fuel delivery systems that allow for the use of conventional, as well as heavy fuels (also known as low vapor pressure fuels) for small, spark ignited engines. The fuel delivery systems described herein provide for greater atomization, or nebulization, of low vapor pressure fuels, and other more traditional small engine fuels, such as gasoline, by heating and pressurizing the fuel, up to a supercritical, or near supercritical, condition and introducing the fuel into the relatively low pressure combustion chamber of an engine to achieve a rapid expansion of the fuel, which is understood to overcome the surface tension forces of low vapor pressure fuels to achieve mists of dispersed submicron drops.

The systems and methods according to the invention will now be explained with reference to certain illustrated embodiments, and in particular to certain illustrated embodiments that depict fuel injection systems for delivering fuel into the combustion chamber of an engine. However, the invention is not to be limited to the embodiments described and depicted herein, but instead it will be realized that the invention embodies many alternative systems and processes that introduce a heated and pressurized fuel to reion of relatively low pressure to achieve atomization of the fuel, and that such systems can include injection systems for delivering fuels to burners, open flames, or any other type of zone of combustion.

Figure 1:
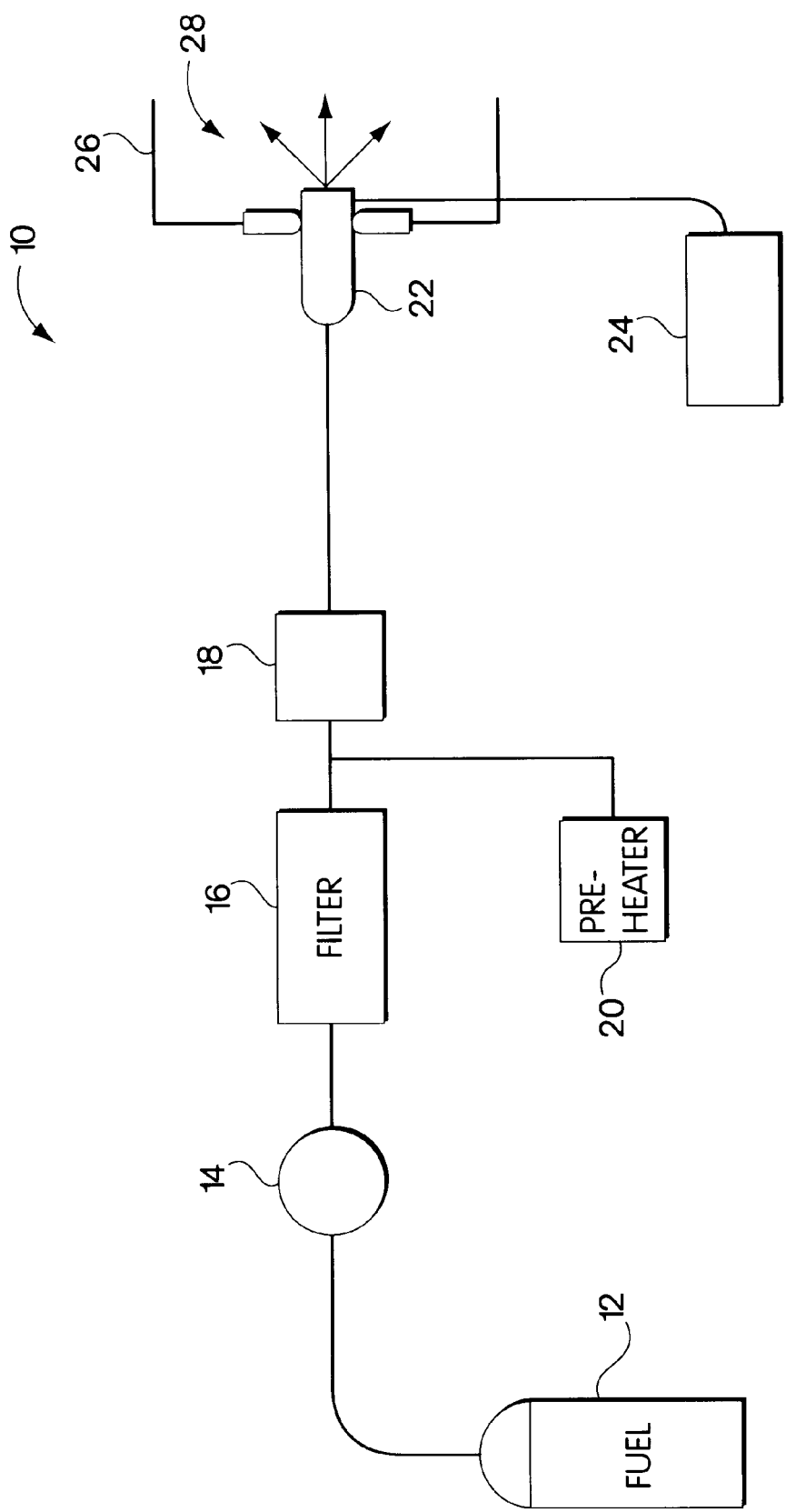
FIG. 1 depicts a functional block diagram of a fuel delivery system having a restrictor for allowing the rapid expansion of a fuel being delivered to a combustion zone.

FIG. 1 is a functional block diagram that depicts a fuel injection system 10 for injecting an atomized spray of liquid fuel, such as gasoline or kerosene, into the combustion zone of an engine. The system 10 depicted in FIG. 1 includes a supply of fuel 12, a pump 14, an optional filter 16, a valve 18, an optional preheater 20, a restrictor 22, and a heater 24. As shown in FIG. 1, the components are arranged such that fuel from the supply 12 can be pumped from the supply 12, through the filter 16, and to the valve 18. The valve 18 can selectively release fuel to the restrictor 22, which extends into the cylinder head 26 of a combustion engine and can deliver an atomized spray 28 of fuel into the combustion zone of the engine cylinder. The pump 14 depicted in FIG. 1 can be a high pressure pump that is capable of providing fuel to valve 18 at pressures up to or within the supercritical range for the fuel. The valve 18, in one embodiment, is synchronized to the spark/rotation cycle of the engine to periodically open and release the pressurized fuel to the restrictor 22. The released fuel passes through the restrictor 22, where at the distal end of the restrictor 22, the fuel is heated to a temperature near or within the supercritical range of the fuel. The heated and pressurized fuel ejects from the distal end of the restrictor 22 as an atomized spray 28. It is understood that the fuel is ejected into the cylinder head 26 which is at a sufficiently low pressure to allow for the rapid expansion of the heated and pressurized fuel. This rapid expansion results in the formation of submicron particles, that can be combusted within the engine cylinder. The formation of small, monodispersed particles by the rapid expansion of supercritical or near supercritical solutions has been discussed in the art, including in the above identified patent application, to which this application claims priority, and incorporates the teachings thereof, as well as in Tom et al. Particle Formation with Supercritical Fluids—A Review, J. Aerosol Sci., 22, 1991 (p. 555), the teachings of which are also incorporated by reference.

More specifically, FIG. 1 depicts a fuel delivery system that pumps fuel from the fuel supply 12 for delivery to the cylinder of the engine. The fuels can include low vapor pressure fuels such as kerosene, jet-petroleum 8, conventional fuels such as gasoline, or propane, and any other suitable fuel, including any suitable solid fuels that can be delivered by the systems described herein in powdered form.

It is understood that the greater atomization or gasification that is achieved when delivering fluids near or above the supercritical temperature, allows for a greater selection of fuels for firing spark ignition engines. For example, the earlier mentioned jet-petroleum 8 can be atomized with the systems described herein for use with a spark ignition engine. It is also understood that other materials, or combination of materials, may now be considered as fuels.

With regard to selecting fuels for use with the systems described herein, it is understood that although the liquid fuel does not need a high vapor pressure, high vapor pressure liquids can work well or better than lower vapor pressure liquid fuels. It is further understood that the processes described herein can atomize most or all liquid fuels, and that these liquid fuels or solutions can consist of a mixture of different compounds. Fluids having lower supercritical temperatures are understood to demonstrate a lower energy input to achieve an effective level of atomization. Moreover, fluids unstable as liquids at STP, can be combined in a pressure cylinder or at a low temperature with other fluids. For example, a primary liquid that is stable at ambient pressure can be placed in a pressure capable container, and then the secondary (or main) liquid can be entered into the primary liquid to which it is miscible. The main liquid or fluid can have a lower supercritical temperature, and the combination results in a desired lowering of the maximum temperature that achieves for the desired degree of atomization. By forming a high concentration primary solution, much of the resultant lower concentration solution is composed of secondary and possible additional solution compounds. Generally, the higher the ratio of a given compound in a given solution, the more the solution properties behaves like that compound. These additional liquids and fluids can be chosen to aid in the atomization, vaporization or gasification of the solution. Choosing a final solution mixture with a desired supercritical temperature can additionally minimize the occurrence of liquid decomposition or impurity reaction inside the atomization apparatus, as well as lower or eliminate the need to heat the fuel upon release into the combustion zone. In some instances the solution may be required to be cooled prior to the release area so that chemical and fluid stability are maintained. One skilled in the art of supercritical fluid solutions can determine possible fuel mixtures. A pressure vessel with a glass window, or with optical fibers and a monitor, allows visual determination of miscibility and liquid compatibility. Conversely, if the restrictor, or other conduits, becomes clogged or a different chemical is found after atomization, then incompatibility under those conditions occurred.

It is further noted that in the depicted system, the fuel is kept below the supercritical temperature until passing into the distal end of the restrictor 22 for atomization. This is understood to simplify the delivery system as well as to keep the dissolved amounts of any precursor or impurities in the region of normal solubility to reduce the potential of developing significant solvent-precursor concentration gradients in the solution. These solubility gradients are a result of the sensitivity of the solution strength of a supercritical solvent with pressure. Small pressure gradients that can develop along the precursor-solvent system delivery lines can lead to significant changes in solubility as can been seen in the following example: The solubility of acridine in carbon dioxide at 308K can be increased 1000 times by increasing the pressure from 75 atm to 85 atm. Such solubility changes are potentially detrimental since they can cause impurities, reactants or materials in the fuel stream to be driven out of solution or react, clogging lines and filters.

In the embodiment depicted in FIG. 1, the fuel supply is shown as a tank, and in one embodiment can be a conventional fuel tank, such as the fuel tanks commonly employed for holding gasoline on combustion engines. Accordingly, in the depicted embodiment, the fuel is stored in a conventional fuel tank, such that the fuel is substantially at ambient temperature, of about approximately 20–25° C., and at ambient pressure of about approximately 1 ATM. However, it will be understood that in other embodiments and applications, such as where the fuel is readily compressed, the fuel tank can be configured to store pressurized or heated fuels.

The fuel supply 12 can connect to the pump 14 via a fluid conduit, such as a conventional automotive fuel supply line. The pump 14 can be a high pressure fuel pump of the type commonly employed with GDI injectors, and in one embodiment comprises a two stage pumping device. One such pump is manufactured and sold by the Lucas-Varity company of Troy Mich. The pump 14 can pressurize the fuel to a pressure near or within the supercritical range of the fuel. For example, the fuel pump 14 can operate to pressurize a supply of gasoline to a pressure of approximately 300 to 800 psi. It will be understood that the critical pressure and critical temperature for gasoline, kerosene, diesel and other fuels can be determined largely from the constituent organic components that make up the fuel mixture, such as octane. The critical pressures and temperatures for these compounds can be ascertained from the CRC Handbook of Chemistry and Physics. For example, the critical pressure and temperature for N-Hexane, which is generally understood as a low end component of gasoline, is given in the CRC Handbook as 231° C. and 31.1 atm.

Although the above described fuel pump 14 operates to pump fuel at a pressure proximate to or at the supercritical range, it will be understood that the amount of pressure required to achieve the desired atomization of fuel in the combustion zone can vary, and that in some applications, fuel under relatively low pressure, such as between about 50 and 100 psi, can be passed through the restrictor and heated at the distal end thereof, to achieve effective atomization. These pressures can be achieved by conventional fuel pumps of the type commonly employed in automobile engines.

The optional filter 16 can be a conventional in-line automotive fuel filter of the type commonly employed for filtering impurities from fuel being drawn from a tank and delivered to an engine. Such filters are sold by the Bosch Company of Stuttgart Germany, and any suitable filter can be employed with the systems described herein without departing from the scope of the invention.

In the depicted embodiment, the system includes an optional preheater 20 that can preheat fuel being delivered to the valve 18. The optional preheater 20 can operate to raise the temperature of fuel being passed to the restrictor 22, thereby bringing the fuel closer to the temperature at which the fuel is when delivered into the combustion zone The preheater 20 is part of the fuel delivery system that controls the temperature of the fuel, in order that a desired atomization can take place upon release of the fuel into the cylinder. It will be understood by those of ordinary skill in the art, that in applications where the material being atomized is to be presented to the combustion zone at a temperature lower than the current temperature of the fuel, the preheater and heater elements described herein can be replace devices for reducing the temperature of the material to be atomized.

FIG. 1 further depicts that fuel passing through the optional filter 16 passes to the valve 18. In one embodiment, the valve 18 is a solenoid valve that can be synchronized to the rotation of the crank of the combustion engine. The valve 18 can be synchronized to release pulses of fuel to the restrictor 22. The valves 18 can be conventional solenoid valves of the type commonly used with high pressure fuel injectors. The valves act to both meter the fuel being passed into the engine cylinder and to synchronize injection with the engine spark/rotation cycle. Accordingly, the valve 18 emits pulses of pressurized fuel to the restrictor 22 with a timing that is selected to deliver the fuel into the engine cylinder at the desired point of the engine cycle. The valve 18 can be any suitable type of valve for synchronizing the delivery of fuel to the restrictor 22. In one embodiment, the valve is an electrical/mechanical converter such as a magnetostrictive converter valve, a piezoelectric converter valve, or any other suitable type of valve capable of synchronizing the delivery of fuel to the restrictor 22.

The restrictor 22 is downstream of the valve 18 and receives fuel from the valve 18 that can be at a pressure that is near or within the supercritical range associated with that fuel. The restrictor can be a metallic tube that has a diameter that is sufficiently small to restrict the flow of fluid, thereby achieving, or maintaining, the selected fluid pressure as the fuel passes through the restrictor 22. In one embodiment, the restrictor 22 has a swaged end or reduced aperture size at the distal-most end of the restrictor 22. It is understood that the reduced final aperture size creates a more uniform pressure along the small diameter nozzle tube. Thus the pressure is more readily maintained above the liquids prior to exiting the distal end. In one embodiment, the restrictor has an inner diameter of about 0.006 inches and an outer diameter of about 0.012 inches. However, the diameter of the restrictor 22 can be selected according to the application, such as by selecting an inner diameter that is well suited for maintaining the fuel at a pressure near or within the supercritical range of that fuel as the fuel is delivered into the cylinder of the engine. It is understood that the release of fluids near or above the supercritical point results in a rapid expansion, which forms a high-speed gas-vapor stream. High velocity gas streams effectively reduce the gas diffusion boundary layer before the restrictor 22. This reduction improves ejection into the combustion zone, and helps propagate the atomized fuel into the cylinder. Increasing the temperature and pressure of the liquid at the distal end of the restrictor can increase the speed of the exiting fuel, which can be desirable in certain applications.

FIG. 1 further depicts that the distal end of the restrictor 22 is coupled to a heater 24. The heater 24 acts to heat the distal end of the restrictor 22, thereby raising the temperature of fluid passing through the distal end of the restrictor 22 to a temperature that is near or within the supercritical range of the fuel being delivered to the engine. It is understood that the fuel being passed through the restrictor 22 will sufficiently expand upon release into the chamber if that fuel is raised to a temperature within approximately 100° C., above or below, of the supercritical temperature for that fuel. Other temperature ranges can be determined for different fuels through experimentation. Furthermore, the heater 24 can operate under the control of a computer system that can selectively adjust the temperature of fuel being passed from the restrictor 22.

The heater 24 can be any suitable device for heating the distal end of the restrictor 22. In one embodiment the heater comprises a resistance-type heater that is activated by passing an electric current between the distal end of the restrictor 22 and the proximal end of the restrictor 22. The directly heated restrictive tube is understood to allow for fast changes in atomization due to a short response time. It is understood that the location of most intense heating can be shifted toward the tip by increasing the connection resistance between the tip and the electrical lead connected to the tip. Thin walled restriction tubes possess a larger resistance than thick walled tubes and decrease the response time. Additionally, small diameter tubing is understood to minimize the time that the fluid is subjected to higher temperatures. In some experiments, successful operation was achieved with flow rates up to 10 ml/min and with tubes with internal diameters of 30 to 125 micrometers. With increasing flow rates multiple tubes or larger internal diameters can be used. In some applications it may be desired to heat just the tip of the restrictor 22 to minimize the potential for chemical reactions or precipitation. Other heating methods can be applied and several have been tested, including remote resistive heating, pilot flame heating, inductive heating, and infrared and laser heating.

Figure 2:
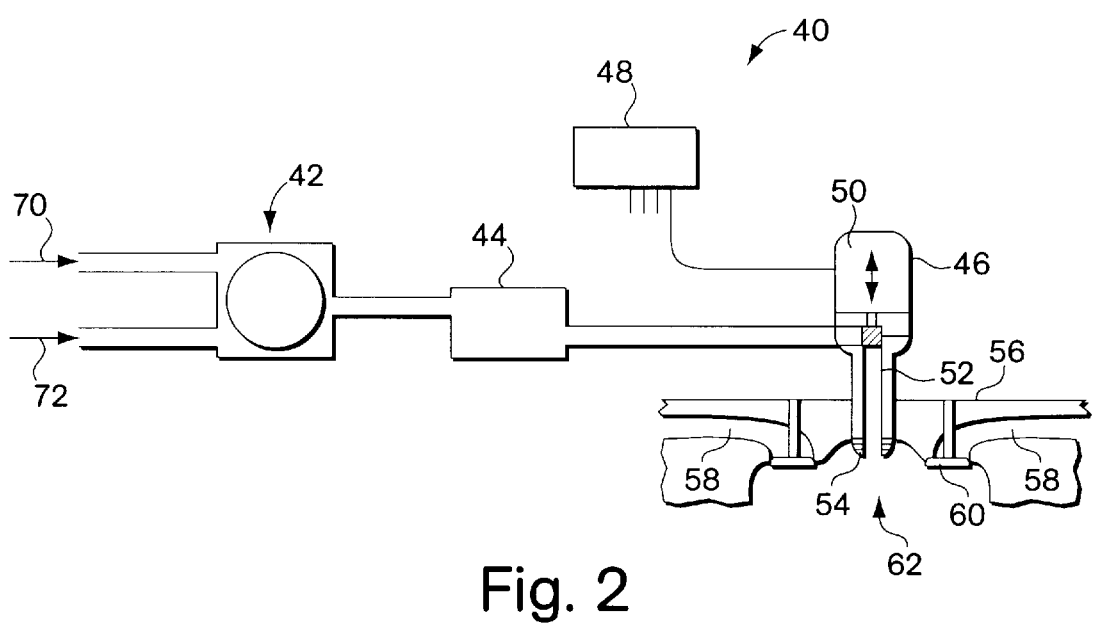
FIG. 2 depicts a functional block diagram of an alternative embodiment of the invention.
Figure 3:
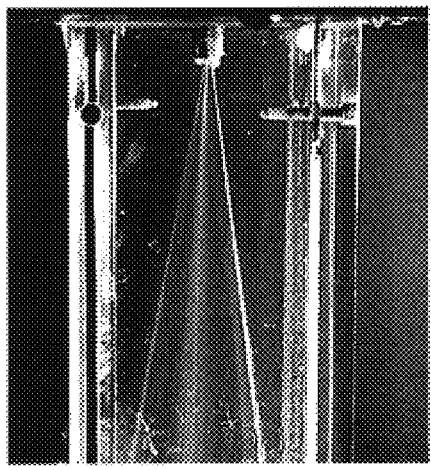
FIG. 3 illustrates a test bed comprising a spray chamber and a conventional fuel injector.
Figure 4:
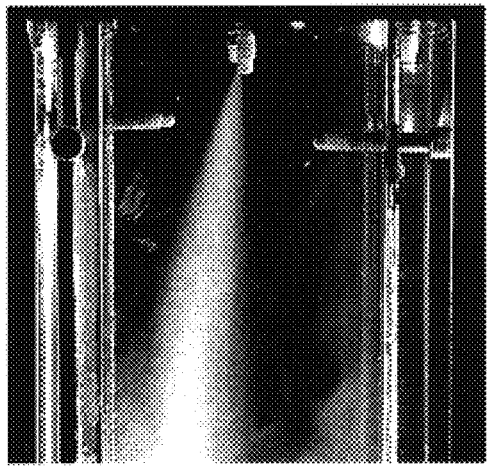
FIGS. 4–6 depict a test bed such as that depicted in FIG. 3, having a fuel delivery system according to the invention.
Figure 5:
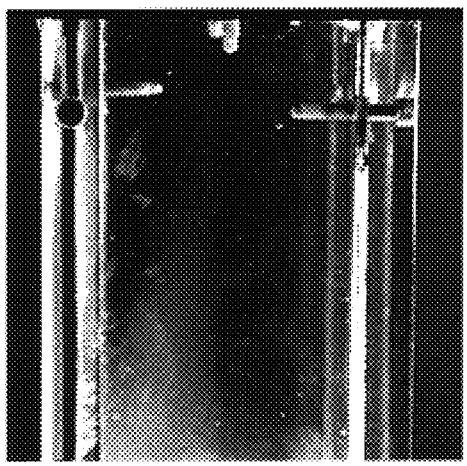
Figure 6:
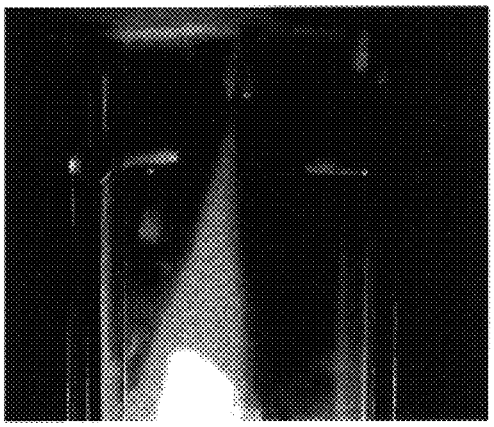

FIG. 2 depicts in greater detail a system according to the invention for delivering a fuel into the cylinder of a combustion engine. As shown in FIG. 2, the system 40 includes a fuel pump 42, a plurality of fuel intake lines 70 and 72 extending from the fuel pump 42 and capable of receiving fuels 70 and 72, a fuel reservoir 44, an ignition control unit 48, an integrated fuel injector 46 having a solenoid-type valve 50, a restrictor 52, and a heater 54, all arranged to form the injector body 46 that can be disposed within the cylinder head 56 of a combustion engine, having intake ports 58, valves 60 and a combustion zone 62.

More particularly, FIG. 2 shows a fuel delivery system 40 capable of delivering fuels from a plurality of fuel sources, wherein each of the fuel sources can have a particular purpose during the engine's operation. For example, one fuel can be a starter fuel such as propane, which is well suited for starting the operation of a combustion engine. The second fuel can be kerosene, or any other low-vapor pressure fuel that can be atomized by the systems described herein to burn well in an engine that has been operating for a sufficient period of time, but often acts poorly for a cold start of a combustion engine.

Specifically, FIG. 2 shows that the system 40 includes a pump 42 that has two inputs that can receive fuels 70 and 72. The pump 42 can selectively receive fuel from either of the two sources and will pressurize the selected fuel to a pressure that is near or within the supercritical range of the fuel. As further shown in FIG. 2, the pump 42 couples to a heated reservoir 44. The pump 42 can pass pressurized fluid to the heated reservoir 44 which can preheat the fluid in the reservoir to a selected temperature. The preheated fuel can pass from the heated reservoir 44 to the injector element 46 that, in the depicted embodiment, comprises an integrated unit having a valve component 50 and a restrictor component 52. The valve component 50 is an electrical circuit with a control unit 48 that can synchronize the operation of the valve 50 with the engine/spark cycle of the combustion engine. The depicted restrictor 52 is a small, metal tube that can fit within the cylinder head of the combustion engine. The restrictor 52 is intermittently coupled into the source of fuel provided by reservoir 44 by operation of the valve component 50. The restrictor 52 is mechanically coupled to the cylinder head 56 and is in fluid communication with the combustion zone 62 of the cylinder. As depicted by FIG. 2, fuel provided by the restrictor 52 can mix with air provided into the combustion zone 62 through the air intakes 58. This is understood to provide a combustible mixture, suitable for firing the depicted spark ignition engine.

By adjusting the heat input into the atomizing device, the liquid solution can be vaporized to various degrees. To this end, the distal end of the restrictor 52 couples to a restive heating element 54 that can be controlled by a thermal control unit (not shown). The resistive heating element 54 can be a resistive tape heater of the type commonly employed for heating pipes of gas delivery systems. The thermal control unit can be of conventional design, and optionally, operates in response to operating parameters of the engine, such as torque or RPM, to vary selectively the degree of vaporization of fuel being ejected into the engine cylinder.

With no heat input to the restrictor 52, liquid fuel solutions of higher supercritical temperature liquids, such as those that are liquids at STP, can exit in the form of a liquid stream. This results in little or no atomization and droplet formation. Operating the thermal control unit to activate the heater 54 decreases the temperature differential of the liquid solution to its supercritical temperature at the distal end of the restrictor 54 and causes a liquid fuel solution to breakup into droplets forming a mist being released into the combustion zone 62. Experimental results indicate that the droplets can vaporize, and become invisible a short distance from the restrictor 52. As the supercritical temperature of the fuel is approached, the liquid fuel solution droplets decrease in size, and the distance to solution vaporization is decreased. In certain experiments, using a fluid delivery system similar to those described above, the vapor droplet size was measured using a laser aerosol size tester and the obtained droplet size was below the detection 1.8 micron limit of the instrument. Further increasing the heat input results in a state of no mist at the tip, or complete vaporization.

This behavior of the solution can be attributed to the combined supercritical properties of the liquid. Solutions of lower supercritical temperature liquids, that are gasses at STP, behave similarly, but in this case the emerging solution from the tip does not form a liquid stream even without heat input. The amount of heat that is understood to obtain optimal vaporization of the solutions appears to depend mostly on heat capacity and the differential between the supercritical temperature of the solvent and the temperature of the liquid reservoir.

As discussed above, the systems described herein provide for the atomization, nebulization, vaporization, or gasification of fuels to provide thereby a source of regularly combustible fuel for a combustion engine. FIGS. 3 through 6 depict the operation of fuel injection systems for delivering a fuel into the cylinder of an engine. Specifically, FIGS. 3 through 6 depict an experimental set up that includes a transparent spray chamber that acts as a fluid tight housing for receiving a spray of fuel ejected from a fuel injection mechanism located in the top plate of the spray chamber. FIG. 3 depicts a spray chamber having a conventional fuel injector disposed within the top plate of that chamber. Effectively, the spray chamber and fuel injector assembly resemble an injector engine cylinder assembly typical of the type of assembly found in a combustion engine having a port fuel injection system for each cylinder. As shown by FIG. 3, the fuel injector effectively ejects a stream of fluid into the spray chamber wherein the stream comprises a directed mist of dispersed food particles as well as s deferral direct streams of essentially liquid fuel. As has been discussed above, the characteristics of this conventional fuel injection system are such that a portion of the fuel ejected into the spray chamber is essentially liquid and the aerosol component of the fuel is formed, at least in part, of relatively large droplets.

In contrast, FIG. 4 depicts a fuel delivery system according to the invention that comprises a fuel injection element that is disposed within the top plate of a spray chamber, to provide an assembly similar to the arrangement depicted in FIG. 3. In FIG. 4 the fuel delivery system acts as a fuel injector for delivering gasoline into the spray chamber depicted in FIG. 4. For the system depicted in FIG. 4, it is understood that gasoline was passed through the restrictor at about 100° C. below the supercritical temperature of gasoline. The spray/atomization characteristics of the fuel injection system show that a mist of very fine particles is injected into the spray chamber. It is understood that the degree of atomization achieved by the injection system depicted in FIG. 4 allows the liquid fuel to burn as a gas, to be mixed more easily within the swirl of a combustion chamber, and to reduce the amount of fuel that fails to combust during the engine rotation cycle.

FIG. 5 depicts the spray chamber assembly of FIG. 4 wherein the fuel injector disposed through the top plate is a fuel delivery system according to the invention. In FIG. 5 the depicted fuel delivery system is operated to pass gasoline through the restrictor at a temperature that is at the supercritical range as the gasoline passes through the distal end of the restrictor. As can be seen from FIG. 5, the resultant injection of gasoline achieves a near to complete vaporization of fuel being injected into the spray chamber. Again, this is understood to allow the liquid gasoline to burn as a gas during the engine rotation cycle.

FIG. 6 depicts the spray chamber assembly of FIG. 3 and FIG. 4, where this time the heavy fuel kerosene is injected into the spray chamber. As can be seen from FIG. 6, the fuel delivery system according to the invention achieves a complete to near complete vaporization of the kerosene fuel. Accordingly, it is understood that the kerosene material would ignite during the engine rotation cycle.

The systems described above are illustrative of the systems of the invention, and not an exhaustive representation thereof. It will be apparent to one of ordinary skill in the art that various modifications and additions can be made to the systems described herein, without departing from the scope of the invention. For example, the systems described herein can be scaled to handle flows from milliliters to liters per hour. The flow can be continuous or pulsed. Numerous mechanisms can be used to relegate the temperature of the fluid to near the supercritical point. Devices for generating magnetic or electric fields can be employed to effect atomization of some fluids or to increase directability and delivery efficiencies. Moreover, other devices can be made that employ the systems of the invention to employ the release of the near supercritical point temperature fluid to cause dispersion and expansion resulting in a very fine nebulization of the solution, which yields improved combustion, and which allow for the utilization of low vapor pressure fuels, such as kerosenes. It will further be understood that the systems described herein can be employed for delivering materials to any number of other combustion zones, including burners of furnaces and into gas turbines, such as jet engines. The systems can also be employed for combusting different materials, including hazardous waste materials and for presenting atomized materials to systems for performing analysis of the composition and other characteristics of the presented sample.

I claim:

1. A burner comprising:

a chamber for receiving an atomized spray of a combustible fuel; and a fuel delivery system for delivering the atomized spray of fuel to the chamber, said fuel delivery system including a source of fuel, a fuel pump in fluid communication with the source of fuel and being capable of pumping fuel at a raised pressure, a restrictor tube having a substantially consistent inner diameter, an input port in fluid communication with the fuel pump and an outlet port, said restrictor tube being adapted to allow fuel to pass from the inlet port to the outlet port and into the chamber, and a heater coupled to a length of the restrictor tube sufficient to atomize the fuel which then forms the atomized spray that is ejected from the outlet port and into the chamber.

2. The burner of claim 1 wherein said heater is directly coupled to said restrictor tube.

3. The burner of claim 1 wherein said heater is capable of heating the restrictor for raising the temperature of the fuel to a temperature within the supercritical range of the fuel, whereby fuel passing through the restrictor is heated to a temperature near or within the supercritical range of the fuel.

4. The burner of claim 1 wherein the restrictor tube comprises a tube formed of an electrically resistive material and the heater includes a source of electrical current being connected to the tube for delivering current therethrough.

5. The burner of claim 1 further comprising:

a thermal control unit for operating the heater to control the temperature of fuel passing through the resrictor, whereby the average size of droplets within the atomized spray can be selected.

6. The burner of claim 1 further comprising:

a mixer for mixing fuel from a plurality of fuel sources.

7. The burner of claim 1 further comprising:

a temperature adjustment device for regulating the fuel to a first temperature prior to being passed to the restrictor tube, and then the fuel is raised to a second temperature in said restrictor tube, said second temperature being higher than said first temperature.

8. The burner of claim 7 further comprising:

means for collecting heat from the chamber for use by the temperature adjustment device to heat fuel being passed to the restrictor tube.

9. The burner of claim 1 wherein said heater is capable of heating the restrictor for raising the temperature of the fuel to a temperature below the supercritical range of the fuel, whereby fuel passing through the restrictor is heated to a temperature below the supercritical range of the fuel.

10. The burner of claim 1 wherein said burner does not include a source of aspirant and no aspirant is used by the burner.

11. The burner of claim 1 wherein the burner is a combustion zone.

* * * * *

UNITED STATES PATENT AND TRADEMARK OFFICE
CERTIFICATE OF CORRECTION

PATENT NO. : 6,390,076 B2
DATED : May 21, 2002
INVENTOR(S) : Hunt

Page 1 of 1

It is certified that error appears in the above-identified patent and that said Letters Patent is hereby corrected as shown below:

Column 1,
Line 3, before "REFERENCE TO RELATED APPLICATIONS" the following paragraph should be inserted:
-- This invention was made with US Government support under contact N00014-97-C-0265 awarded by the Office of Naval Research. The US Government has certain non-transferable rights in the invention. --.

Signed and Sealed this

Fifteenth Day of November, 2005

JON W. DUDAS
*Director of the United States Patent and Trademark Office*